United States Patent
Qianjun et al.

(10) Patent No.: US 12,001,583 B2
(45) Date of Patent: Jun. 4, 2024

(54) METHOD TO MANAGE MULTIPLE VIRTUAL DOCUMENTS IN A CONTACTLESS SECURE ELEMENT

(71) Applicant: THALES DIS FRANCE SAS, Meudon (FR)

(72) Inventors: Jong Qianjun, Meudon (FR); Heng Khai Ng, Meudon (FR); Qi Rong Lai, Meudon (FR); Harmony Stephanie Ang, Meudon (FR); Junjie Daniel Ngui, Meudon (FR); Hermanto Ong, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 156 days.

(21) Appl. No.: 17/296,533

(22) PCT Filed: Nov. 25, 2019

(86) PCT No.: PCT/EP2019/082354
§ 371 (c)(1),
(2) Date: May 24, 2021

(87) PCT Pub. No.: WO2020/120111
PCT Pub. Date: Jun. 18, 2020

(65) Prior Publication Data
US 2021/0397736 A1    Dec. 23, 2021

(30) Foreign Application Priority Data
Dec. 11, 2018  (EP) .................................... 18306666

(51) Int. Cl.
G06Q 20/32     (2012.01)
G06F 21/62     (2013.01)
H04W 12/42     (2021.01)

(52) U.S. Cl.
CPC ........ G06F 21/6245 (2013.01); H04W 12/42 (2021.01)

(58) Field of Classification Search
CPC ... G06F 21/6245; H04W 12/42; H04W 12/40; H04L 63/0281
(Continued)

(56) References Cited

U.S. PATENT DOCUMENTS

2014/0058937 A1* 2/2014 Watson ................ G06Q 20/425
705/41

OTHER PUBLICATIONS

PCT/EP2019/082354, International Search Report, dated Dec. 5, 2019, European Patent Office, P.B. 5818 Patentlaan 2 NL—2280 HV Rijswijk.
(Continued)

Primary Examiner — Jeffrey C Pwu
Assistant Examiner — Nega Woldemariam

(57) ABSTRACT

A contactless Secure Element compliant to an inter-industry Secure Element contactless management standard where a Card Reset privilege or Implicit Selection parameter on a contactless interface is compulsory for an Identification Virtual Document application to be able to communicate with an external entity, said Secure Element has a proxy application having the Card Reset privilege or Implicit Selection parameter on the contactless interface and being adapted to receive any command from an external entity for any of the available Identification Virtual Document application belonging to any one of the different standards of Identification Virtual Document, to extract a select command comprising an Logical Data Structure application identifier, to identify and to determine the corresponding recipient Identification Virtual Document application using the extracted Logical Data Structure application identifier and to forward such a command to the determined corresponding recipient Identification Virtual Document applica-
(Continued)

tion, the proxy application then returning the response of the select command and subsequent commands from the corresponding recipient Identification Virtual Document application to the external entity.

8 Claims, 8 Drawing Sheets

(58) Field of Classification Search
USPC .......................................................... 726/27
See application file for complete search history.

(56) References Cited

OTHER PUBLICATIONS

PCT/EP2019/082354, International Search Report, dated Dec. 5, 2019, European Patent Office, D-80298 Munich.

Disclaimer: "Technical Report: Logical Data Structure (LDS) for Storage of Data in the Contactless IC Doc 9303-10 LDS 2—New Applications for publication on the ICAO Website Logical Data Structure (LDS) for Storage of Data in the Contactless IC Doc 9303-10 LDS 2—New Applications", (Apr. 30, 2018), XP055589362, Retrieved from the Internet: URL:https://www.icao.int/Security/FAL/TRIP/Documents/TR%20-%20Logical%20Data%20Structure%20LDS%20for%20Storage%20of%20Data%20V20.7.pdf [retrieved on May 16, 2019] Annex A.

Simalliance interoperability Working Group: "Mobile Near Field Communication (Mobile NFC) Stepping Stones Version 1.0.0", (Jun. 15, 2011), XP055019103, Retrieved from the Internet: URL:http://www.simalliamce.org/ [retrieved on Feb. 10, 2012] Chapter 3.

Paul A Karger et al: "Implementing a High-Assurance Smart-Card OS", (Jan. 25, 2010), Financial Cryptography and Data Security, Springer Berlin Heidelbberg, Berlin, Heidelberg, pp. 51-65, XP019147524, ISBN: 978-3-642-14576-6 the whole document.

\* cited by examiner

METHOD TO MANAGE MULTIPLE VIRTUAL DOCUMENTS IN A CONTACTLESS SECURE ELEMENT

FIELD OF THE INVENTION

The present invention relates to a Secure Element, SE in the following, compliant to an inter-industry Secure Element contactless management standard where a Card Reset privilege or Implicit Selection parameter on a contactless interface is compulsory for an Identification Virtual Document, IVD in the following, application to be able to communicate with an external entity, Such SE comprises several Dedicated File (DF) and/or several Elementary File, EF in the following, for several IVD belonging to different standards of IVD, each of these DF having a specific Logical Data Structure, LDS in the following, required in Dedicated Specifications, DS in the following, of the standards of IVD for global interoperability and the organization of data on the contactless SE, these DS mandating that the IVD are selected through use of an LDS application identifier, LDS AID in the following.

The invention also pertains to a method to manage several Identification Virtual Document applications corresponding to several IVD belonging to different standards of IVD in a contactless Secure Element compliant to an inter-industry Secure Element contactless management standard where a Card Reset privilege or Implicit Selection parameter on a contactless interface is compulsory for an IVD application to be able to communicate with an external entity.

BACKGROUND OF THE INVENTION

Contactless secure elements have a contactless interface enabling communication between external entities and internal IVD applications as defined in IVD standards which define logical data structures LDS for each type of IVD.

In order for an instance to be selected via selection of a DF name of the LDS, an IVD application must first have the Card Reset privilege or Implicit Selection parameter on the contactless interface.

However, the Card Reset privilege or Implicit Selection parameter for the contactless interface may only be applied to a single application at any one time. Given this, it is impossible to have more than one such implicitly selected application, be it electronic Machine Readable Travel Document, eMRTD in the following, or electronic Driving License, eDL in the following, or electronic Identity, eID in the following, or other type of IVD applications, in one secure element.

In payment field, a solution named CREL AEPM application implementation exists. It allows multiple payment applications to coexist on the secure element, but, only single payment application activated in a time. This implements an activation flag allocated to a single application and manages the Contactless Activation State of all registered payment applications such that it ensures only single payment application activated at a time. However, applications have to be of the same type in this solution for compatibility reason because the CREL AEPM application does not manage the business logic of different type of applications, and this is not applicable in the case where several types of IVD can be activated and addressed at the same time.

Further alternative and advantageous solutions would, accordingly, be desirable in the art.

SUMMARY OF THE INVENTION

The present invention aims at enabling multiple virtual documents to be accessible on a same contactless secure element.

The present invention is defined, in its broadest sense, as a contactless secure element compliant to an inter-industry Secure Element contactless management standard where a Card Reset privilege or Implicit Selection parameter on a contactless interface is compulsory for an Identification Virtual Document application to be able to communicate with an external entity, said SE comprising several Dedicated File and/or several Elementary File for several IVD belonging to different standards of IVD, each of these DF having a specific Logical Data Structure required in Dedicated Specifications of the standards of IVD for global interoperability and the organization of data on the contactless SE, these DS mandating that the IVD are selected through use of an LDS application identifier, said SE comprising a proxy application having the Card Reset privilege or Implicit Selection parameter on the contactless interface and being adapted to receive any command from an external entity for any of the available IVD application belonging to any one of the different standards of IVD, to extract a select command comprising an LDS AID, to identify and to determine the corresponding recipient IVD application using the extracted LDS AID and to forward such a command to the determined corresponding recipient IVD application, the proxy application then returning the response of the select command and subsequent commands from the corresponding recipient IVD application to the external entity.

This invention is a unique solution which allows the existence and usage of more than one IVD application (i.e. eMRTD, eDL, eID, etc.) at the same time in one secure element.

This invention allows the management, coexistence and activation of multiple IVD (eMRTD/eDL/eID) applications on the secure element accessible via the contactless interface. This leads to better availability management of multiple IVD (eMRTD/eDL/eID) applications active at any one single time.

The proxy application of the invention ensures there is not more than one application instance which have the same LDS AID activated at the same time in contactless interface.

The LDS AID indeed corresponds to the DF name as contained in the application instance and the two terms can be used indifferently: DF name and LDS AID for the meaning of the invention.

Advantageously, the different standards of IVD are chosen among electronic Driving License (eDL), electronic Identity (eID) and electronic Machine Readable Travel Document (eMRTD) standards.

Those standards are the more commonly used standards and the invention will be very useful for a user to have a secure element to host applications for his/her virtual driving license, national identity card and passport. Of course, there could be other standards in the future for which the same invention is applicable.

With the above described design, the proxy will always forward commands received from contactless terminal, for example, a select command comprising a DF Name, to the correct eMRTD/eDL/eID recipient application which is currently activated.

Thus, in a preferred embodiment, the proxy application is extended as a Contactless Registry Event Listener (CREL)

in order to manage multiple IVD applications of a same standard of IVD, the proxy application being then further adapted to:

select an IVD standard based on a LDS AID specified in the select command, select the IVD application having an activated Contactless Activation State, of the corresponding standard which contains the LDS chosen in the select command by means of its identifier LDS AID, forward the initial select command and subsequent commands to the activated IVD application for the standard selected using the DF name until the reception of a new select command having different LDS AID, return respectively the response of the initial select command and subsequent commands from the activated IVD application for the standard selected using the LDS AID to external entity on behalf of the IVD application itself.

This embodiment enables to go further in the selection of the IVD to communicate with an external entity as it enables to manage Contactless Activation States of multiple IVD applications of a same standard of IVD.

Unlike the CREL AEPM application which allows only a single payment application to be activated at any one time while deactivating any other payment applications, the proxy application of the invention allows the contactless availability/activation management of more than one IVD application (i.e: eMRTD/eDL/eID) at the same time as long as each of these applications relate to unique LDS AID. For applications related to the same LDS AID, only one such application could be activated at any one time.

Advantageously, the proxy application is adapted to manage the Contactless Activation State of multiple IVD applications of a same standard of IVD, by listening to the activation and deactivation events of IVD applications:

when receiving a notification of contactless activation of an IVD application, said notification including an application identifier AID, verifying the existence of previously activated IVD application of the same standard, thus having the same LDS identifier LDS AID, deactivating the previously activated IVD application of the same standard if exists, storing the reference of a newly activated IVD application as the currently activated IVD application of the corresponding standard, when receiving a notification of contactless deactivation of an IVD application, said notification including an application identifier AID, clearing the stored reference of the previously activated IVD application of the corresponding standard, marking that there is currently no activated IVD application of the corresponding standard.

These features enable to process Contactless Activation States of the application in support of the implementation of the invention. These features are related to the CREL mechanism to ensure that there is only one activated IVD application of the same standard at any time. It is here noted that "previously activated IVD application" refers to an IVD application that is currently activated but not the target application of the notification mentioned here as the notification mechanism will indeed contain the AID of the application being activated. The idea here is that at any point in time, only one IVD application of the same standard should be activated.

The present invention also relates to a method to manage several Identification Virtual Document applications corresponding to several IVD belonging to different standards of IVD in a contactless Secure Element compliant to an inter-industry Secure Element contactless management standard where a Card Reset privilege or Implicit Selection parameter on a contactless interface is compulsory for an IVD application to be able to communicate with an external entity, said SE comprising several Dedicated File and/or several Elementary File corresponding to the several IVD as defined in corresponding standards, each of these DF having a specific Logical Data Structure required in Dedicated Specifications of the standards of IVD for global interoperability and the organization of data on the contactless SE, these DS mandating that the IVD are selected through use of an LDS application identifier, said method comprising the steps of:

taking the Card Reset privilege or Implicit Selection parameter on the contactless interface, receiving any command from an external entity for any of the available IVD application belonging to any one of the different standards of IVD, extracting an LDS AID from the received command, identifying and determining the corresponding recipient IVD application using the extracted LDS AID, interacting with the corresponding recipient IVD application, forwarding such a select command and subsequent commands to the determined corresponding recipient IVD application, and returning respectively the response of the select command and subsequent commands from the corresponding recipient IVD application to the external entity.

This method enables to have several IVD available on a same contactless secure element. The different standards of IVD are advantageously chosen among but not limited to eDL, eID and eMRTD standards.

In a preferred embodiment, the method further comprises, in order to manage multiple IVD applications of a same standard of IVD as a Contactless Registry Event Listener (CREL), the steps of:

selecting an IVD standard based on a LDS AID specified in the select command, selecting the IVD application having an activated Contactless Activation State, of the corresponding standard which contains the LDS chosen in the select command by means of its identifier LDS AID, forwarding the initial select command and subsequent commands to the activated IVD application for the standard selected using the LDS AID until the reception of a new select command having same or different corresponding LDS AID, returning respectively the response of the initial select command and subsequent commands from the activated IVD application for the standard selected using the DF name to the external entity on behalf of the IVD application itself.

Advantageously the method further comprises the step of managing the Contactless Activation State of multiple IVD applications of a same standard of IVD, said step comprising the sub-steps of:

when receiving a notification of contactless activation of an IVD application, verifying the existence of previously activated IVD application of the same standard, deactivating the previously activated IVD application of the same standard if exists, storing the reference of a newly activated IVD application as the currently activate" IVD application of the corresponding standard, when receiving a notification of contactless deactivation of an IVD application, clearing the reference of the previously activated IVD application of the corresponding standard, marking that there is currently no activated IVD application of the corresponding standard.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
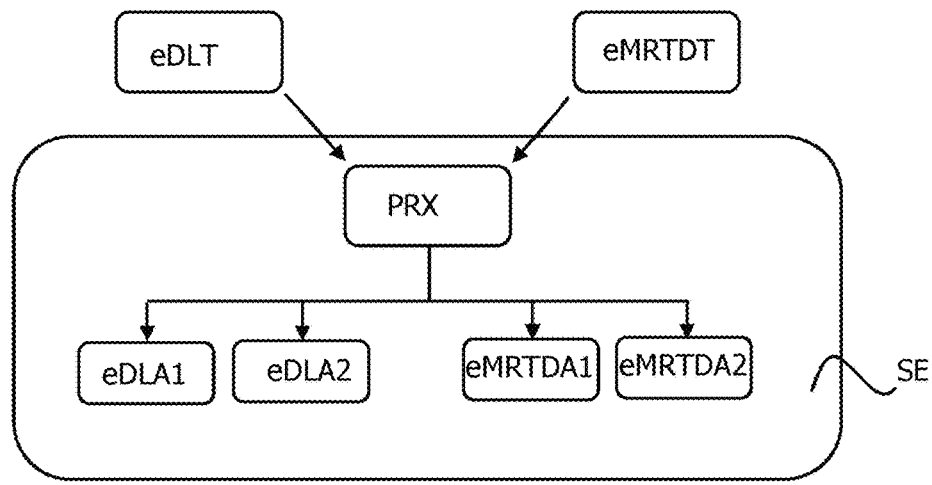
FIG. 1 schematically represents an environment where the invention is implemented.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows an environment where the invention is implemented. In this environment, a contactless Secure Element SE is adapted to enter in communication with at least two distinct terminals, each compliant with a specific IVD standard. In the example, the first terminal eDLT is an Electronic Driving License (eDL) terminal and the second terminal eMRTDT is an Electronic Machine Readable Travel Document (eMRTD) terminal. It is here noted that the term eMRTD is used interchangeably with ePPT and ePassport in the current standards.

The SE of the invention comprises a proxy PRX which will process any request from the terminals towards one of several Identification Virtual Document, IVD in the following, applications, here two IVD applications eDLA1 and aDLA2 corresponding to driving licenses and two applications eMRTDA1 and eMRTDA2, corresponding to passports.

It exists various specifications defining a logical data structure, LDS in the following, for eMRTDs/eDLs/eIDs required for global interoperability and the organization of data on the contactless secure element.

These specifications mandate that the eMRTDs/eDLs/eIDs be selected through use of an LDS application identifier (AID) as a reserved Dedicated File, DF in the following, name. These AIDs are not the application instance AID of each of these applications. The instance containing the dedicated file DF should have a different instance AID than the LDS AID. What is governed by the IVD standard is only the LDS AID but not the instance AID. Application Instance AID is unique in SE.

Indeed the LDS AID is a dedicated file DF Name which is used by the instance. Hence, the existence of multiple eMRTD/eDL/eID in SE is indeed possible and not limited.

Indeed, the AID refers to the DF name of a dedicated file DF contained in an application instance. The location of the dedicated file DF is illustrated in the following images. FIG. 2 gives two examples of specification for IVD documents.

Figure 2A:
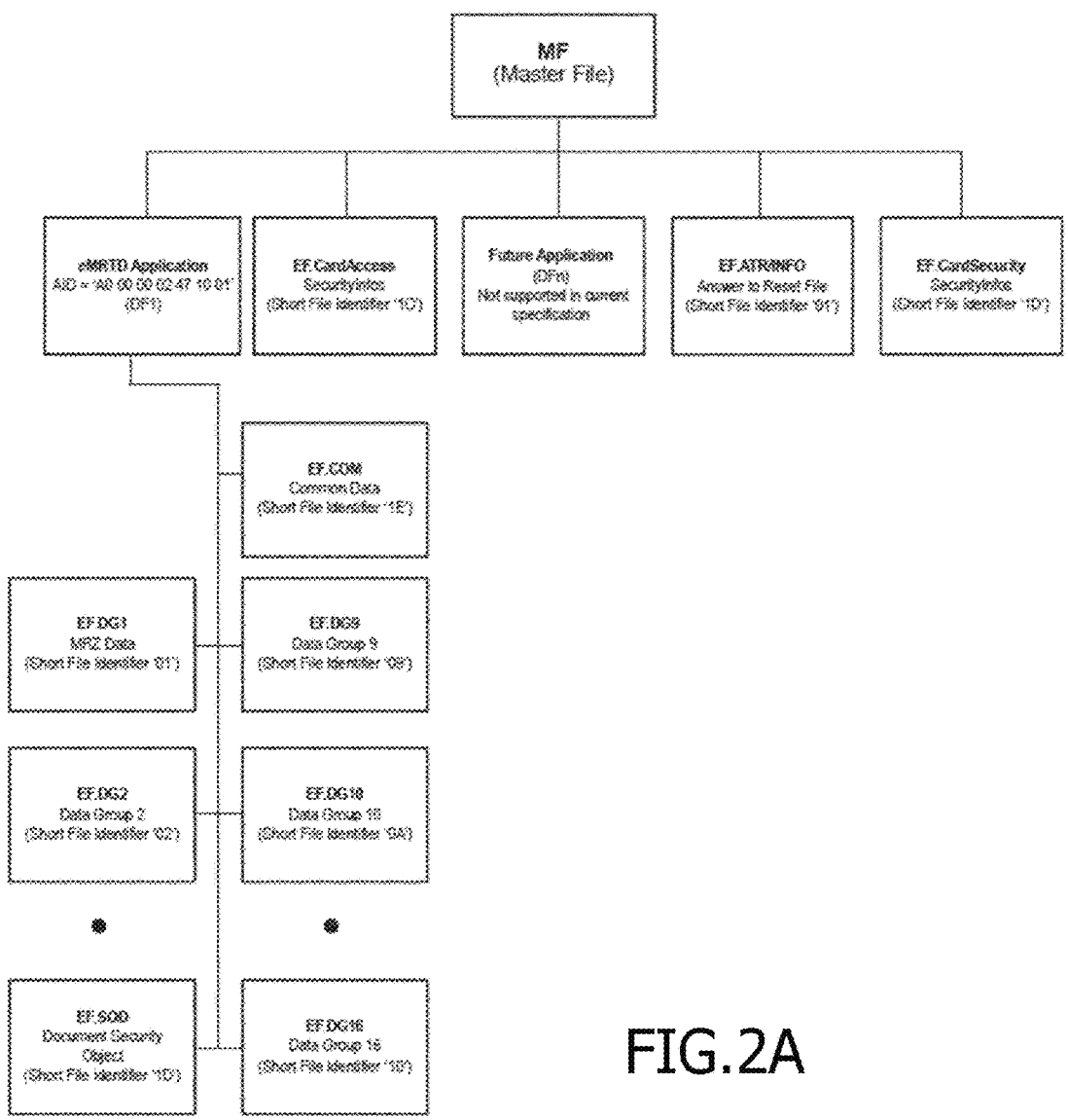
FIGS. 2A and 2B show two file structure summaries of the prior art for two distinct standards of IVD.

FIG. 2A shows a state of the art file structure summary for an eMRTD application. The Logical Data Structure is specific to this IVD. An eMRTD application is a dedicated file DF1 which is part of a master file MF. The master file MF also comprises elementary files EF dealing with security issues, here card access data EF.CardAccess, and card security data EF.CardSecurity, and with reset issues, here answer to reset data EF.ATR/INFO. The master file MF can also comprise future applications as further dedicated files DFn.

More precisely, according to ICAO 9303 part 10:

"The eMRTD application SHALL be selected by use of the Application (AID) as a reserved DF name. The AID SHALL consist of the Registered application identifier assigned by ISO according [ISO/IEC 7816-5] and a Proprietary application identifier Extension (PIX) as specified within this document:

The Registered application identifier is 0xA000000247;

The issuer stored data application SHALL use PIX=0x1001;

The full AID of the eMRTD application is 'A0 00 00 02 47 10 01'

Within each application there may be number of Data Groups sometimes referred to as Elementary Files (EFs). The issuing State or organization application may have up to 16 Data Groups. Data Group 1 (DG1), the machine readable zone (MRZ) and Data Group 2, the encoded face, are REQUIRED. All other DATA Groups are OPTIONAL. All Data Groups are in the form of data templates and have individual ASN.1 Tags."

The dedicated file DF1 has a specific structure comprising several elementary files EF including common data EF.COM, machine readable zone, MRZ in the following, data EF.DG1, several data groups EF.DG2 to EF.DG16 in the example, and document security object data EF.SOD.

Each of the elementary files has a short file identifier indicated on the figure. Those identifiers are specific to the description of the logical data structure as defined for the eMRTD.

Figure 2B:
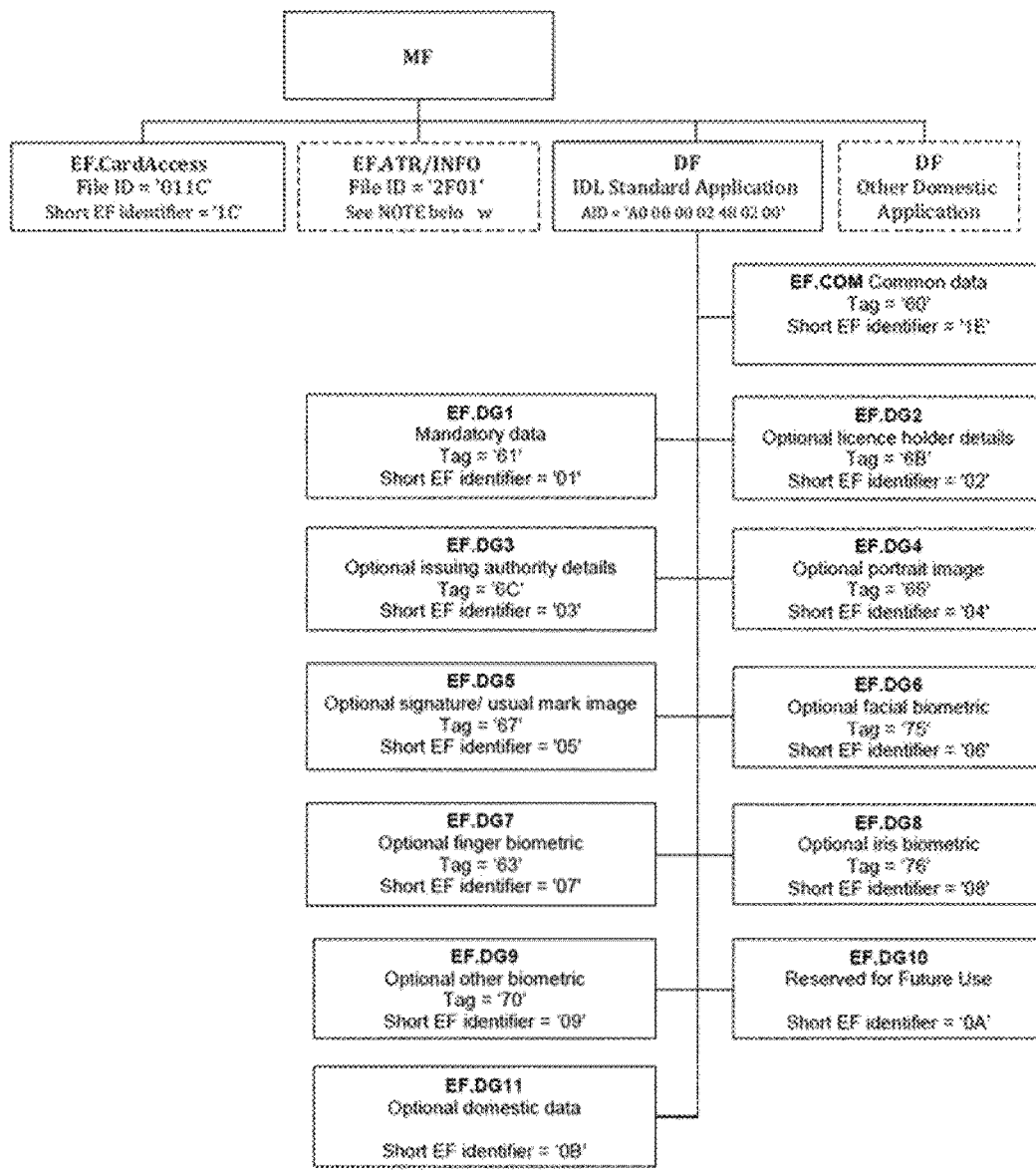
Figure 3A:
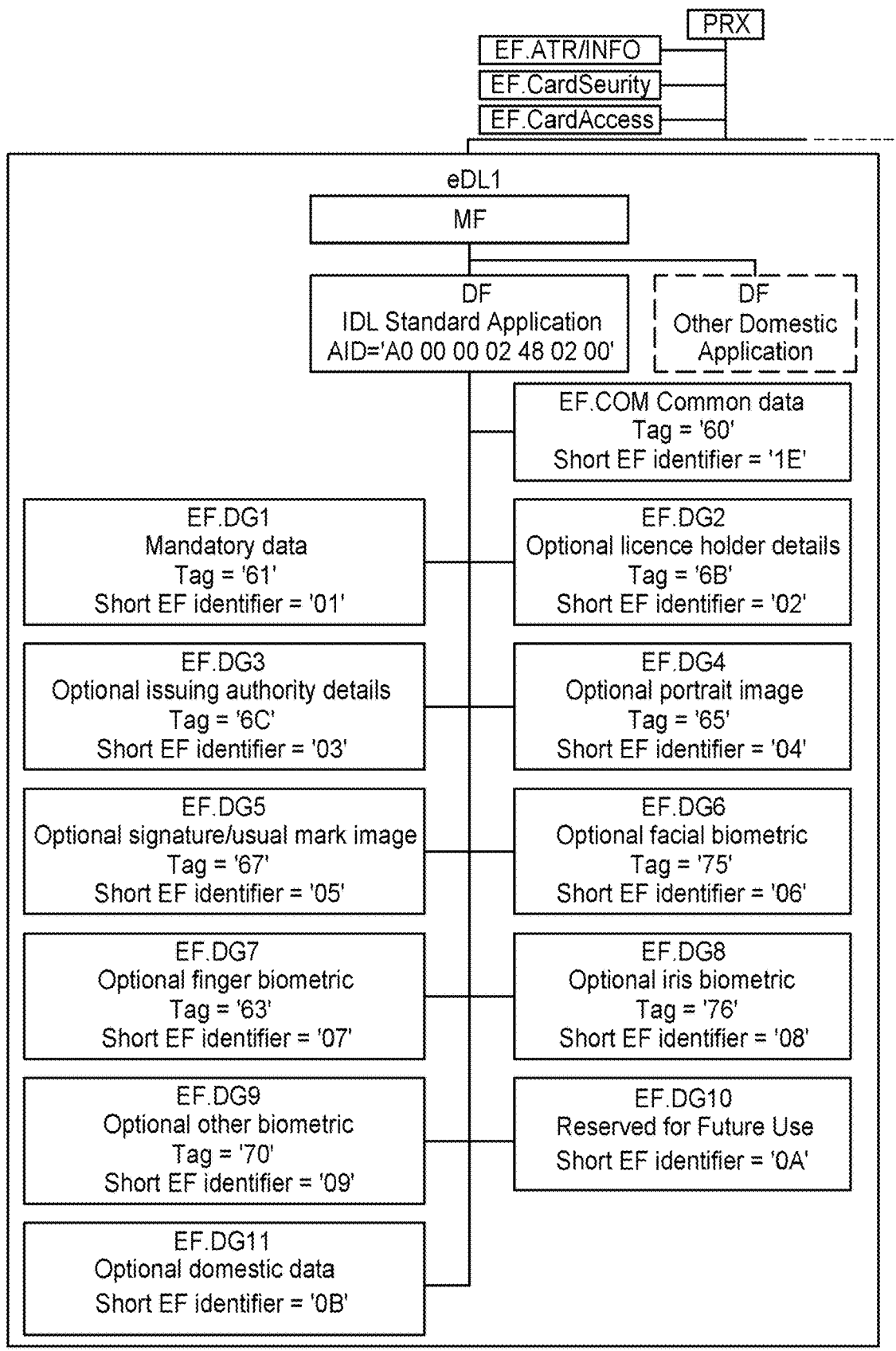
FIG. 3 shows a file structure summary of the invention.
Figure 3B:
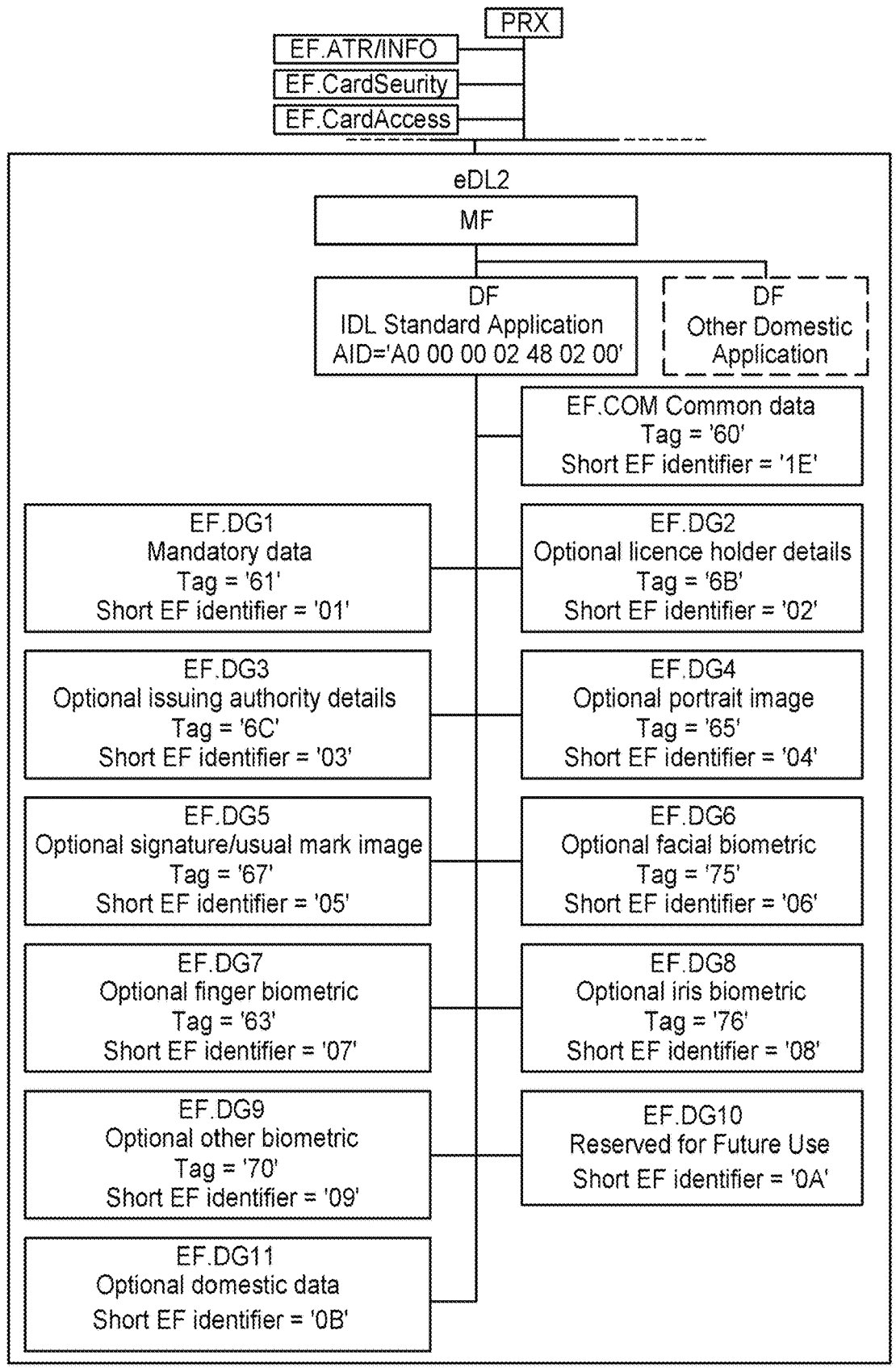
Figure 3C:
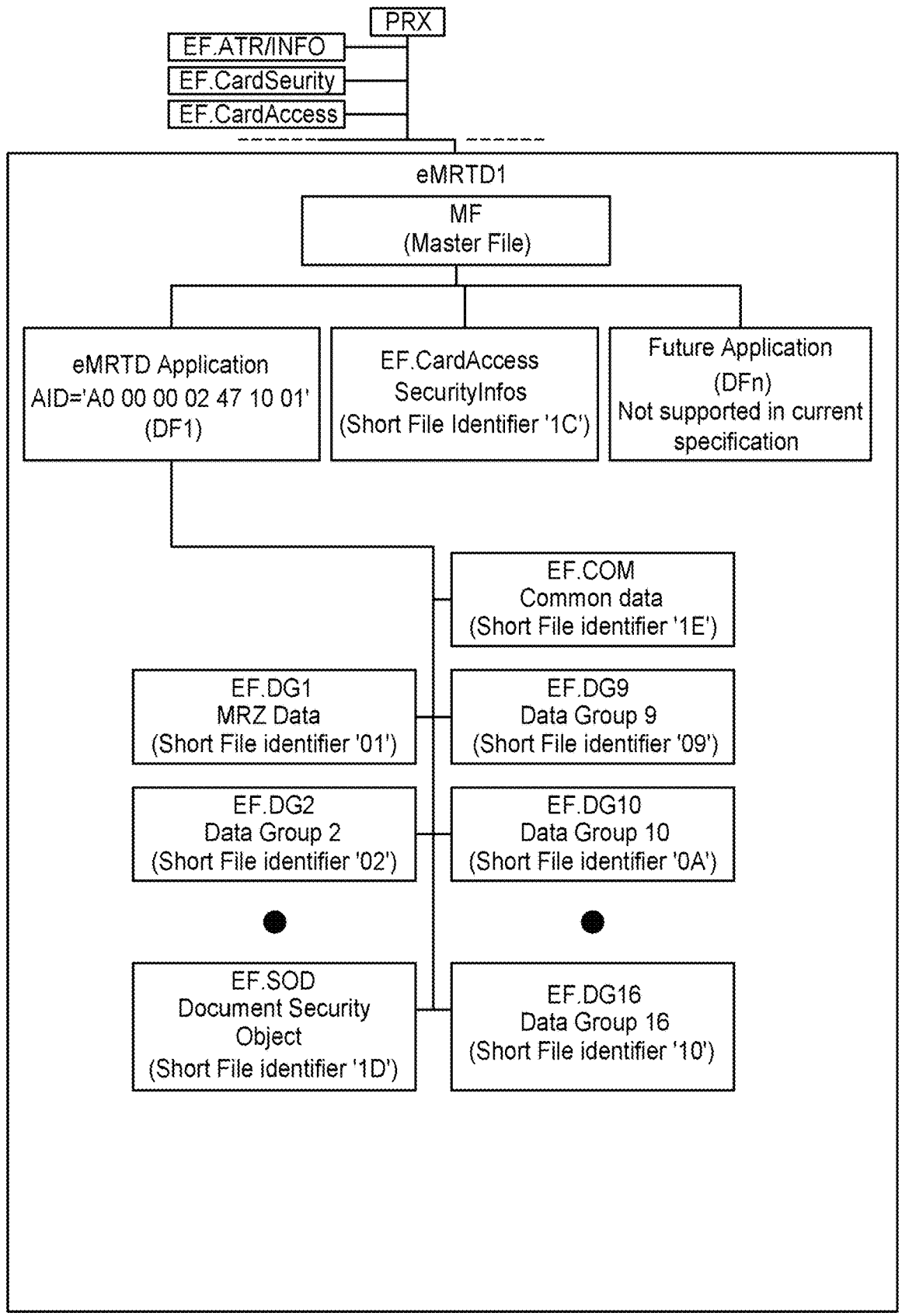
Figure 3D:
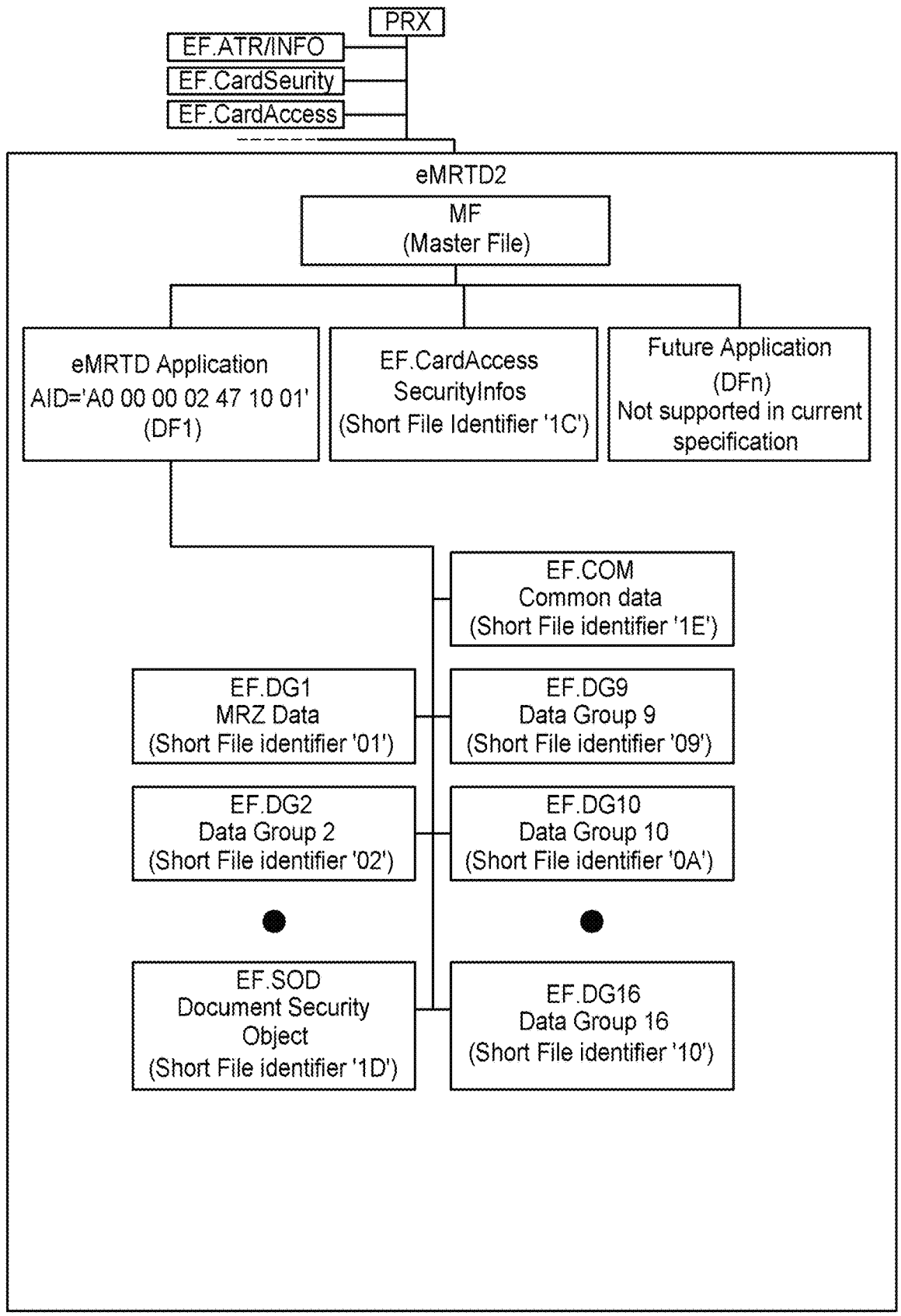

FIG. 2B shows a file structure summary as defined for Electronic Driving License. Each eDL application is a dedicated file DF, part of a master file MF which also comprises several elementary files EF including here: a card access file EF.CardAccess to secure the access to the card and an answer to reset file EF.ATR/INFO. The IDL application is defined as one DF. The DF for standard encoding is identified as follow: 'A0 00 00 02 48 02 00'

The DF is selected using its AID. If other applications exist on the card, they would be contained within their own DF and would be accessed via their separate AID. Each DF consists of a number of elementary files EF. The DF for standard encoding consists of one EF containing common data, and one EF for each of the data groups defined in Annex C of the IEC 18013-2 2008 standard.

More precisely, the dedicated file DF of an eDL application includes several elementary files EF: a common data file EF.COM, a mandatory data file EF.DG1, several optional data group files EF.DG2 to EF.DG11 here, EF.DG10 being reserved for future use.

Each of the elementary files EF has a short file identifier and those identifiers are specific to the eDL specifications defining the logical data structure LDS.

According to the state of the art, in order for an instance of an application to be selected via the selection of the DF name of the LDS, the corresponding application must first have a Card Reset privilege or an implicit selection parameter on the contactless interface. However, the Card Reset privilege or Implicit Selection parameter for the contactless interface may only be applied to a single application at any one time. Given this, it is impossible to have more than one such implicitly selected application, be it either eMRTD/eDL/eID, at a single time, in one secure element in the prior art.

The invention introduces a proxy application PRX that is given the Card Reset privilege or Implicit Selection parameter for the contactless interface. FIG. 3 shows a file structure summary of the invention where a proxy application PRX has the Card Reset privilege or Implicit Selection parameter for the contactless interface. This proxy application PRX comprises the common elementary files EF.ATR/Info for the reset, EF.CardSecurity for the security card management and EF.CardAccess for the card access management.

Then the proxy application PRX comprises several dedicated master files MF that are each corresponding to one of the IVD applications. Those master files MF are not anymore having the common elementary files now attached to the proxy application PRX but comprise the dedicated files as defined in corresponding standards. Each dedicated file comprises the elementary files as presented in previous FIGS. 2A and 2B.

This proxy application PRX, implicitly selected application having the Card Reset privilege or Implicit Selection parameter for the contactless interface anytime, receives all commands. These commands comprise an initial SELECT command containing the DF name followed by other commands supported by the eMRTD/eDL/eID applications. The proxy application PRX uses the LDS AID to detect what is the targeted application.

Then the proxy application forwards these commands to the correct recipient application based on the initially sent SELECT command which contains a dedicated file DF name. The recipient is determined by the LDS AID or the DF name in the SELECT command, which uniquely defines each type of application.

Figure 4:
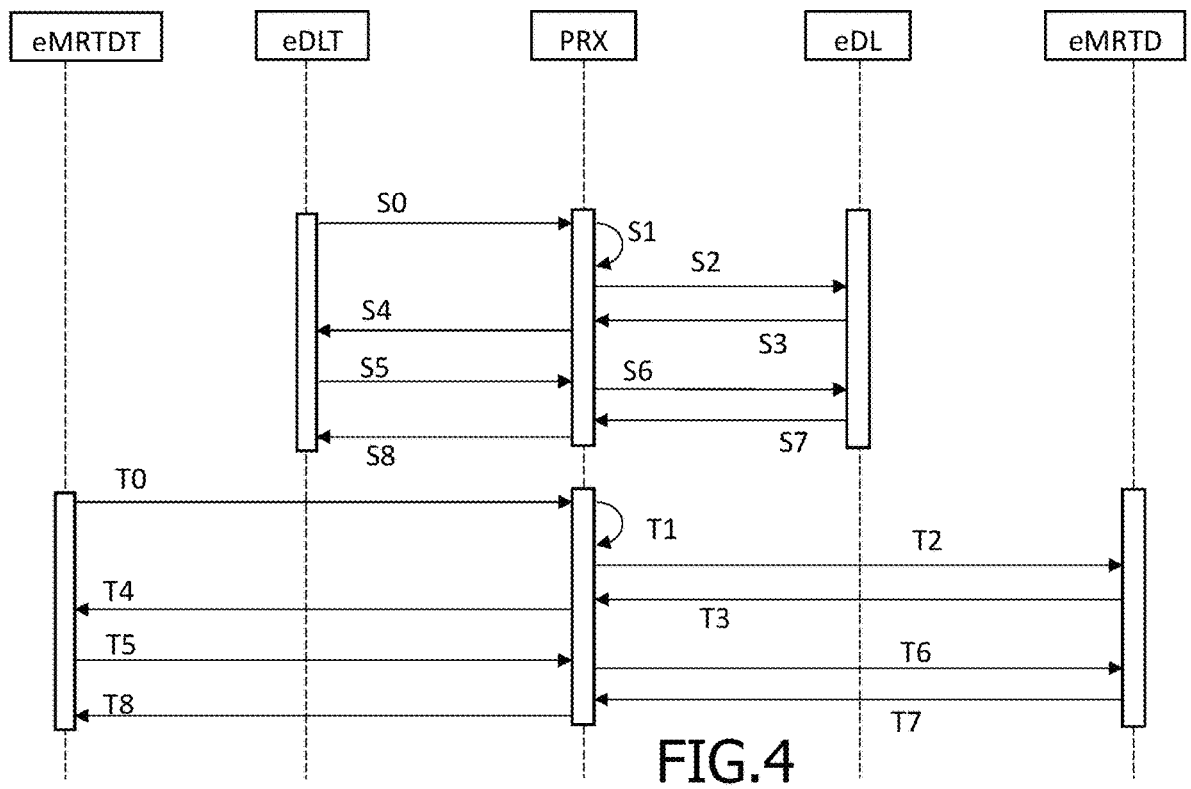
FIG. 4 shows a schematic time diagram of the commands processing at the proxy application of the invention.

FIG. 4 schematically shows exchanges between applicative terminals of different kinds: eMRTDT and eDLT, the proxy application PRX and the IVD application eDL and eMRTD. It represents a time sequence where the proxy application PRX is implicitly selected whatever the time a command arrives at the contactless secure element having the proxy application PRX. By default, the Contactless Activation State of the applications eDL and eMRTD are activated. For a given SE, the eDL and eMRTD are not necessarily both activated. However, in the diagram the assumption is that the current Contactless Activation States are activated for the both.

In a first step S0, a driving license terminal eDLT sends a SELECT command for the selection of the DF name for a driving license: eDL LDS AID to the contactless secure element. When receiving such a SELECT command for the eDL, the proxy application PRX finds the currently activated electronic driving license eDL in a step S1. Then the proxy application PRX forwards the select eDL LDS AID to the corresponding driving license application eDL in a step S2.

The application eDL then responds to the proxy application PRX in a step S3 as if it directly responded to the eDL terminal eDLT. The Select eDL LDS AID response is then forwarded by the proxy application PRX to the terminal eDLT in a step S4 as if it was the application eDL which directly responded.

Subsequent commands are then sent to the application eDL according to a similar way in subsequent step S5. This triggers the transfer of the commands to the activated driving license application eDL in a step S6 and subsequent response in step S7 and forward of the response in step S8. Steps S5 to S8 are repeated as far as needed.

A similar time diagram is then shown when an electronic machine readable travel document terminal eMRTDT. In a step T0, a SELECT command comprising the DF name for the eMRTD is sent by the eMRTD terminal eMRTDT to the contactless secure element. While receiving this SELECT command, the proxy application finds the currently activated eMRTD application in a step T1. The select command with the DF name/LDS AID is sent to the currently activated application eMRTD in a step T2. The application eMRTD then responds as it responds directly to the terminal eMRTDT in a step T3. The select eMRTD LDS AID response is then forwarded to the terminal eMRTDT as if coming directly from the application eMRTD in a step T4. Then subsequent command(s) are processed in subsequent steps T5 to T8.

FIG. 4 illustrates the processing of commands to identification virtual documents with all types of IVD activated when the SELECT command and subsequent commands concerns the currently activated IVD application. The invention thus enables to access diverse kinds of IVD: eDL or eMRTD or other types of IVD based on the read LDS AID.

However, in this design, only a single eMRTD application, a single eDL application and a single eID application, one of each type of application, shall exist and be activated in the card.

Additionally, the proxy application PRX can thus also be extended to become a CREL application in order to manage single/multiple eMRTD, single/multiple eDL and single/multiple eID application(s) to coexist in the Secure Element.

When the proxy application is configured as a CREL application, it can manage these available eMRTD/eDL/eID applications by ensuring that only a single eMRTD, a single eDL and a single eID application can be activated at any one time. The proxy application will select the correct recipient based on the specified DF name in the select command as well as the Contactless Activation State (activated) of the application which contain the chosen LDS AID. The initial SELECT command and subsequent command(s) will then be forwarded to this particular application, which fulfils the previously stated condition.

Figure 5:
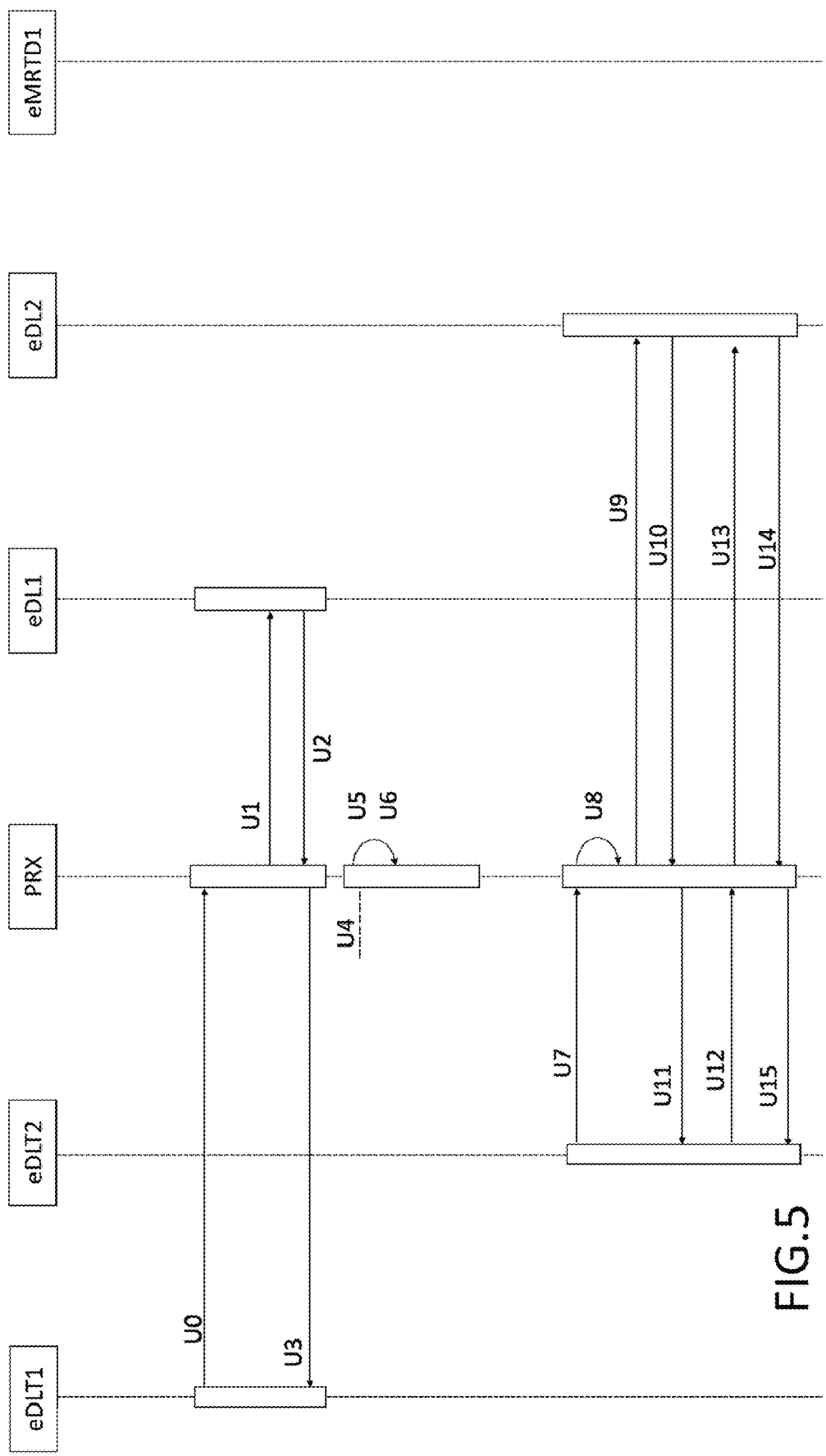
FIG. 5 shows a schematic time diagram of the activation of an electronic driving license application according to the invention.

FIG. 5 shows a case where the currently activated IVD application is not the ones targeted by the IVD's terminal commands. In practice, it shows the use case of changing the desired driving license. It is a similar situation to the one where, having multiple credit card in a wallet, and when realizing that the merchant does not accept Master Card, then the user wants to swap to a VISA card which is accepted by the merchant.

The figure thus illustrates the swapping of different driving license. For example, when the user has both local and international driving licenses. When the user in his/her country, local driving license is used, but when he/she are oversea he/she will change to the international driving license.

In this figure, the initial situation is such that the proxy application PRX is implicitly selected. The Contactless Activation State of a first driving license application eDL1 is activated. Also, accessorily for the illustrated case, a first machine readable travel document application eMRTD1 is activated. Thus any other driving license or MRTD application is deactivated, specifically a second driving license eDL2 is deactivated. In this case, the proxy application is a CREL application for the applications eDL1, eDL2 and MRTD1.

In the shown time diagram, a first step U0, a SELECT command for the LDS AID of an electronic driving license eDL LDS AID is sent by a first driving license terminal eMRTD1 to the proxy application PRX. The select command is forwarded to the currently activated driving license application eDL1 in a step U1. A response is then sent by the driving license application eDL1 to the proxy application PRX in a step U2 like if it was directly sent back to the terminal eDL1. The proxy application PRX forwards the response to the terminal eDLT1 in a step U3.

Meanwhile, the proxy application receives a notification of activation of the second driving license application eDL2 in a step U4. In a step U5, the proxy application PRX deactivates any other driving license application eDL and ensures only the second driving license eDL2 is activated. The eDL2 reference is stored as activated in a step U6. At this time, the Contactless Activation State of the first driving license application eDL1 is deactivated and the ones of the second driving license application eDL2 and of the MRTD application MRTD1 are activated. It is important to note here that the Contactless Activation State of eMRTD1 remains unchanged as the activation in step U5 is applicable only to IVD standard of eDL and not eMRTD.

Then when the proxy application PRX receives a SELECT command with the eDL LDS AID in a step U7, it will find the second driving license application eDL2 as activated in step U8 and will forward the received select command to the activated driving license application eDL2 in a step U9. Indeed the LDS AID as received in the select command enables to know what kind of IVD is targeted by the command as received and then the currently activated application of the kind of IVD is then known internally by the proxy application which manages the status of several IVD in one single kind of IVD.

The following steps U10 to U15 are similar to the ones S3 to S8 as presented in FIG. 4. During the steps as shown on FIG. 5, Contactless Activation State of eMRTD1 remains unchanged. eMRTD1 has different LDS AID as stated as its specification. It will be connected to an MRTD terminal if a SELECT command with the MRTD LDS AID is received.

Indeed, as shown on FIG. 5, when the CREL proxy application is notified of an activation of a new eDL (e.g. eDL2) application, it will check and deactivate the eDL (e.g. eDL1) application which is currently activated. This ensures that only a single eMRTD, a single eDL and a single eID is activated at any one time. Upon receiving the SELECT command containing a DF name with eDL's LDS AID, this command shall be forwarded by the proxy to the currently activated eDL (eDL2).

With this preferred embodiment of the invention, swapping of different eMRTD/eDL/eID applications is possible through the activation of the desired eMRTD/eDL/eID application. The terminal shall only communicate with the eMRTD/eDL/eID application which has been activated on the contactless interface. The proxy application will then forward any subsequent commands based on the received initial SELECT command containing the DF name to the correct recipient which is currently activated.

Figure 6:
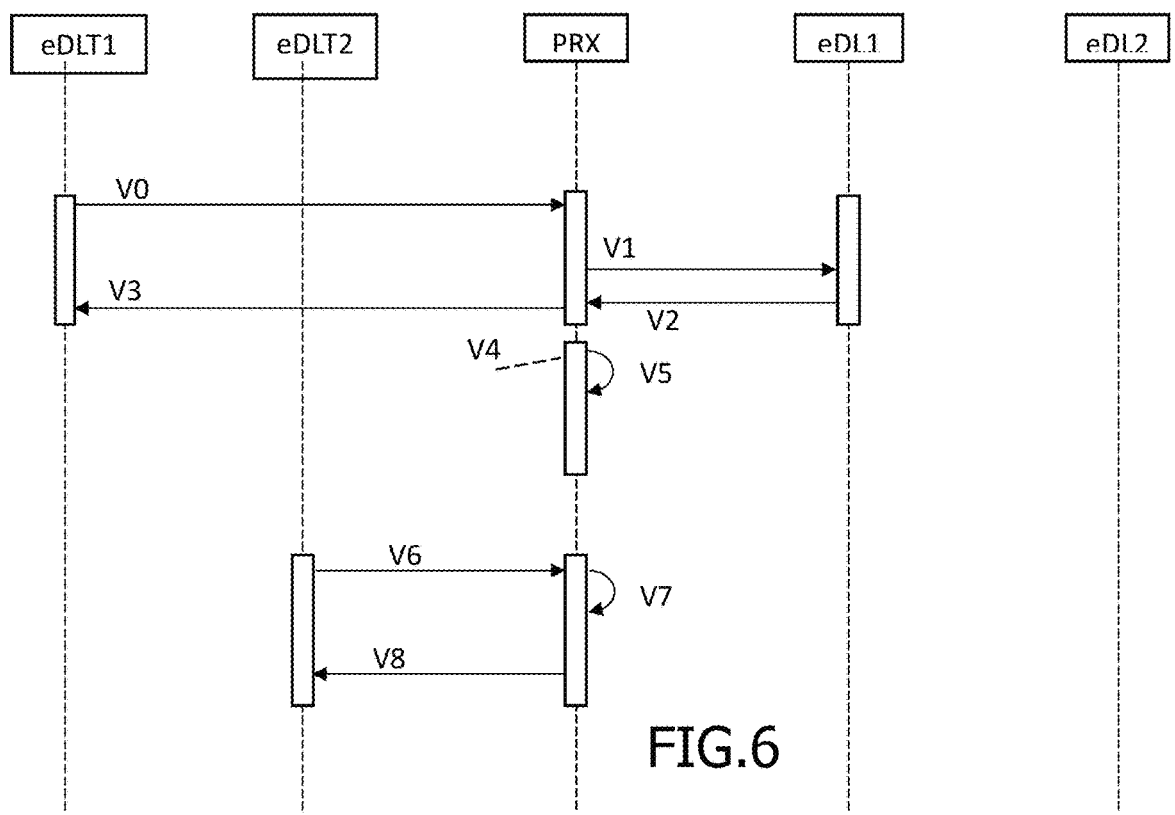
FIG. 6 shows a schematic time diagram of the de-activation of an electronic driving license application according to the invention.

FIG. 6 shows a time diagram where an activated driving license eDL1 is intentionally deactivated, contrarily to the case illustrated in FIG. 5 where the deactivation is inherent to the activation of another IVD of the same kind.

In this figure, the initial situation is such that the proxy application is implicitly selected at the contactless secure element's interface.

The Contactless Activation State of a first driving license eDL1 is activated. The second one eDL2 is deactivated. The proxy application is a CREL application of eDL1, eDL2.

On this figure, first steps V0 to V3 are similar of steps U0 to U3. Then the proxy application receives a notification of deactivation of the first driving license application eDL1 in a step V4. The notification comes from the device in which the secure element is embedded. It can be typically a card operating system or another secure element application or even the proxy itself, depending on how the invention has been implemented.

For example, the activation is controlled by a mobile wallet installed on a mobile device carrying the secure element. Such a mobile wallet typically displays the available IVD on the secure element and the user can choose the IVD he needs or wants to use. The proxy could also play the role of the wallet, so it will be the one to notify itself of the change to be performed.

In a step V5, the first driving license application eDL1 is deactivated and thus none of the eDL reference is stored as activated. The Contactless Activation State of the first and second driving license applications eDL1 and eDL2 are deactivated. Indeed Contactless Activation State of eDL2 remains deactivated.

When a SELECT command for an electronic driving license is received at the proxy application PRX in a step V6, the proxy application PRX searches, in a step V7 the currently activated driving license application eDL and finds that none of the electronic driving license application is activated. The selection of an electronic driving license eDL is rejected in a step V8. In this case, none driving license is anymore available at the contactless secure element.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A contactless Secure Element (SE) compliant to an inter-industry Secure Element contactless management standard where a Card Reset privilege or Implicit Selection parameter on a contactless interface is compulsory for an Identification Virtual Document (IVD) application (eDL, eMRTD) to be able to communicate with an external entity (eMRTDT, eDLT), said Secure Element (SE) comprising:

several Dedicated File (DF) and/or several Elementary File (EF) for several Identification Virtual Document belonging to different standards of Identification Virtual Document, each of these Dedicated File (DF) having a specific Logical Data Structure (LDS) required in Dedicated Specifications (DS) of the standards of Identification Virtual Document for global interoperability and the organization of data on the contactless Secure Element (SE), these Dedicated Specifications mandating that the Identification Virtual Document are selected through use of an Logical Data Structure application identifier, a proxy application (PRX) having the Card Reset privilege or Implicit Selection parameter on the contactless interface and being adapted to receive any command from an external entity (eMRTDT, eDLT) for any of the available Identification Virtual Document application (eM RTD, eDL) belonging to any one of the different standards of Identification Virtual Document, to extract a select command comprising an Logical Data Structure application identifier, to identify and to determine the corresponding recipient Identification Virtual Document application (eMRTD, eDL) using the extracted Logical Data Structure application identifier and to forward such a command to the determined corresponding recipient Identification Virtual Document application (eMRTD, eDL), the proxy application (PRX) then returning the response of the select command and subsequent commands from the corresponding recipient Identification Virtual Document application (eMRTD, eDL) to the external entity (eMRTDT, eDLT), and wherein the proxy application (PRX) is extended as a Contactless Registry Event Listener (CREL) in order to manage multiple Identification Virtual Document applications of a same standard of Identification Virtual Document.

2. The contactless Secure Element (SE) according to claim 1, wherein the different standards of Identification Virtual Document are chosen among electronic Driving License (eDL), electronic Identity (eID) and electronic Machine Readable Travel Document (eMRTD) standards.

3. The contactless Secure Element (SE) according to claim 1, the proxy application (PRX) being then further adapted to:

select an Identification Virtual Document standard based on a Logical Data Structure application Identifier specified in the select command, select the Identification Virtual Document application having an activated Contactless Activation State, of the corresponding standard which contains the LDS chosen in the select command by means of its identifier Logical Data Structure application identifier, forward the initial select command and subsequent commands to the activated Identification Virtual Document application for the standard selected using the DF name until the reception of a new select command having same or different Logical Data Structure application identifier, return respectively the response of the initial select command and subsequent commands from the activated Identification Virtual Document application for the standard selected using the Logical Data Structure application identifier to external entity on behalf of the Identification Virtual Document application itself.

4. The contactless Secure Element (SE) according to claim 3, wherein the proxy application (PRX) is adapted to manage the Contactless Activation State of multiple Identification Virtual Document applications of a same standard of Identification Virtual Document, by listening to the activation and deactivation events of Identification Virtual Document applications:

when receiving a notification of contactless activation of an Identification Virtual Document application, said notification including an application identifier (AID),
verifying the existence of previously activated Identification Virtual Document application of the same standard, thus having the same Logical Data Structure application identifier (LDS AID),
deactivating the previously activated Identification Virtual Document application of the same standard if exists,
storing the reference of a newly activated Identification Virtual Document application as the currently activated Identification Virtual Document application of the corresponding standard,
when receiving a notification of contactless deactivation of an Identification Virtual Document application, said notification including an application identifier (AID),
clearing the stored reference of the previously activated Identification Virtual Document application of the corresponding standard,
marking that there is currently no activated Identification Virtual Document application of the corresponding standard.

5. A method to manage several Identification Virtual Document (IVD) applications corresponding to several Identification Virtual Document belonging to different standards of Identification Virtual Document in a contactless Secure Element (SE) compliant to an inter-industry Secure Element contactless management standard where a Card Reset privilege or Implicit Selection parameter on a contactless interface is compulsory for an Identification Virtual Document application to be able to GMT3827-5 V10-100 communicate with an external entity, said Secure Element comprising several Dedicated File (DF) and/or several Elementary File (EF) corresponding to the several Identification Virtual Document as defined in corresponding standards, each of these DF having a specific Logical Data Structure (LDS) required in Dedicated Specifications (DS) of the standards of Identification Virtual Document for global interoperability and the organization of data on the contactless Secure Element, these Dedicated Specifications mandating that the Identification Virtual Document are selected through use of an Logical Data Structure application identifier (LDS AID), said method comprising: —taking the Card Reset privilege or Implicit Selection parameter on the contactless interface,
receiving any command from an external entity for any of the available Identification Virtual Document application belonging to any one of the different standards of Identification Virtual Document,
extracting an Logical Data Structure application identifier from the received command, —identifying and determining the corresponding recipient Identification Virtual Document application using the extracted Logical Data Structure application identifier, interacting with the corresponding recipient Identification Virtual Document application, —forwarding such a select command and subsequent commands to the determined corresponding recipient Identification Virtual Document application, and returning respectively the response of the select command and subsequent commands from the corresponding recipient Identification Virtual Document application to the external entity, wherein the proxy application (PRX) is extended as a Contactless Registry Event Listener (CREL) in order to manage multiple Identification Virtual Document applications of a same standard of Identification Virtual Document.

6. The method according to claim 5, wherein the different standards of IVD are chosen among electronic Driving License (eDL), electronic Identity (eID) and electronic Machine Readable Travel Document (eMRTD) standards.

7. The method according to claim 5, further comprising, in order to manage multiple Identification Virtual Document applications of a same standard of Identification Virtual Document as a Contactless Registry Event Listener (CREL), the steps of:

selecting an Identification Virtual Document standard based on a Logical Data Structure application identifier specified in the select command, selecting the Identification Virtual Document application having an activated Contactless Activation State, of the corresponding standard which contains the Logical Data Structure chosen in the select command by means of its identifier Logical Data Structure application identifier, forwarding the initial select command and subsequent commands to the activated Identification Virtual Document application for the standard selected using the Logical Data Structure application identifier until the reception of a new select command having same or different corresponding Logical Data Structure application identifier, returning respectively the response of the initial select command and subsequent commands from the activated Identification Virtual Document application for the standard selected using the Dedicated File name to the external entity on behalf of the Identification Virtual Document application itself.

8. The method according to claim 5, said method comprising the step of managing the Contactless Activation State of multiple Identification Virtual Document applications of a same standard of Identification Virtual Document, said step comprising the sub-steps of:

when receiving a notification of contactless activation of an Identification Virtual Document application, verifying the existence of previously activated Identification Virtual Document application of the same standard, deactivating the previously activated Identification Virtual Document application of the same standard if exists, storing the reference of a newly activated Identification Virtual Document application as the currently activated Identification Virtual Document application of the corresponding standard, when receiving a notification of contactless deactivation of an Identification Virtual Document application, clearing the stored reference of the previously activated Identification Virtual Document application of the corresponding standard, marking that there is currently no activated Identification Virtual Document application of the corresponding standard.

* * * * *